(12) United States Patent
Charpin

(10) Patent No.: US 6,949,142 B2
(45) Date of Patent: Sep. 27, 2005

(54) DEVICE FOR CONTROLLING A SURFACE TREATMENT INSTALLATION IN AUTOMOTIVE INDUSTRY

(75) Inventor: Lionel Charpin, Meylan (FR)

(73) Assignee: Eisenmann France Sarl (FR)

( * ) Notice: Subject to any disclaimer, the term of this patent is extended or adjusted under 35 U.S.C. 154(b) by 0 days.

(21) Appl. No.: 10/240,435

(22) PCT Filed: Mar. 29, 2001

(86) PCT No.: PCT/FR01/00956

§ 371 (c)(1), (2), (4) Date: Apr. 19, 2003

(87) PCT Pub. No.: WO01/75540

PCT Pub. Date: Oct. 11, 2001

(65) Prior Publication Data

US 2003/0154920 A1 Aug. 21, 2003

(30) Foreign Application Priority Data

Mar. 30, 2000 (FR) .......................... 00 04074

(51) Int. Cl.$^7$ .............................. B05C 11/10
(52) U.S. Cl. ...................... 118/695; 118/697; 118/698; 118/696
(58) Field of Search ................................ 118/696, 697, 118/698, 695, 704, 712, 713; 901/43; 700/123, 253, 249, 248, 247

(56) References Cited

U.S. PATENT DOCUMENTS 4,614,300 A * 9/1986 Falcoff ......................... 239/71
5,656,089 A * 8/1997 Rouvelin ..................... 118/663
5,718,767 A * 2/1998 Crum et al. ................. 118/669
2002/0192357 A1 * 12/2002 Dion ............................. 427/8

OTHER PUBLICATIONS

Marcuse et al, "Servers in SCADA Applications", IEEE Transactions on Industry Applications, vol. 33, No. 5, Sep. 1997 pages 1295–1299.*

Suh et al., "Prototype Integrated Robotic Painting System: Software and Hardware Development", Journal of Manufacturing Systems, Dearborn, MI, vol. 12, No. 6, 1993, pp. 463–473.*

* cited by examiner

Primary Examiner—Chris Fiorilla
Assistant Examiner—George Koch
(74) Attorney, Agent, or Firm—Cantor Colburn LLP

(57) ABSTRACT

A system comprising at least a multiaxial machine, each axis being equipped with motor means, provided with a sprayer and corresponding sensor and actuator, is provided. Said system comprises a means for supervising an installation including at least a computer provided with a display means and a means for inputting data; at least one programmable computer for managing the axes of the machine and the sprayer; a server for programming a spraying table; a first computer network connecting the server to the programmable computer for managing the machine and to the means for supervising the installation; and a second computer network connecting the programmable computers for managing the machine to the sensor and actuator of said machine.

13 Claims, 3 Drawing Sheets

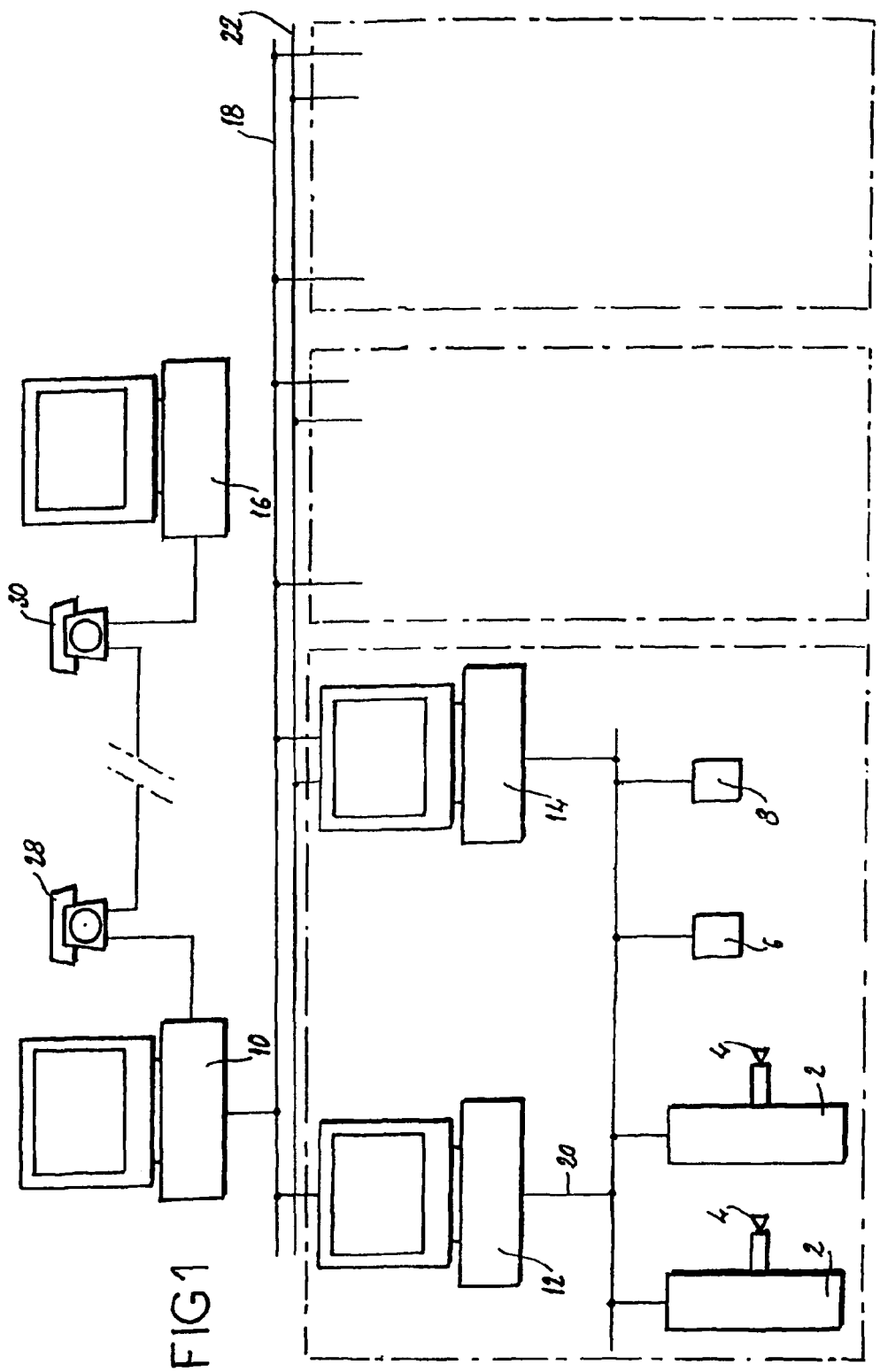

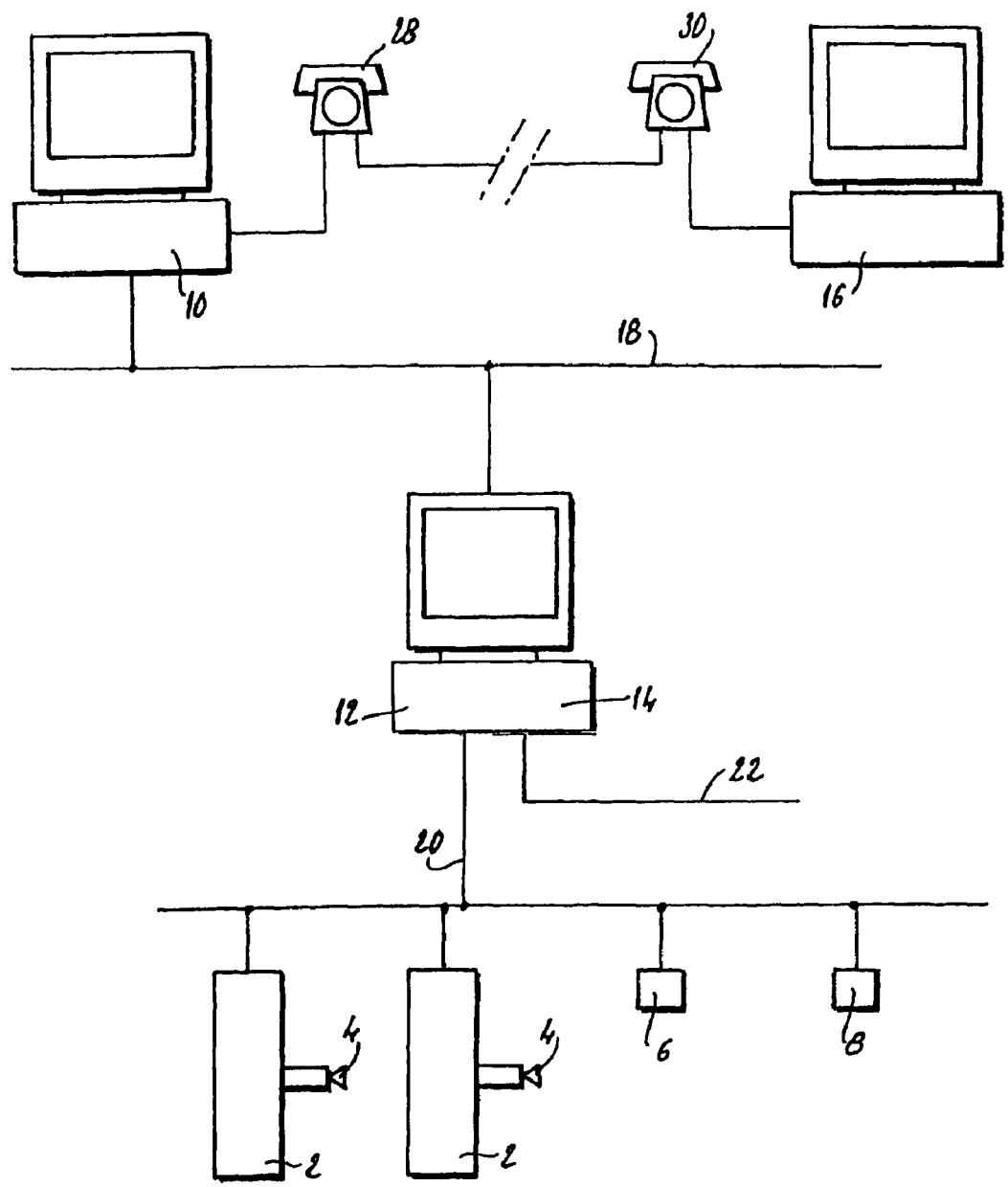

DEVICE FOR CONTROLLING A SURFACE TREATMENT INSTALLATION IN AUTOMOTIVE INDUSTRY

BACKGROUND OF INVENTION

1. Field of Invention

The present invention relates to a device for controlling a surface treatment installation, in particular for the automotive industry.

2. Description of Invention

In the automotive industry, a surface treatment installation intended, for example, for painting bodyworks carried and moved by a conveyor comprises, for example, a set of six machines which are intended to coat the side walls of the bodyworks and a machine, known also as the "overhead machine" intended to coat surfaces which lie roughly horizontally. Each of the six lateral machines is equipped with a sprayer, while the overhead machine comprises three distinct sprayers. Such an installation operates in synchronism with the conveyor transporting the bodyworks. It also has a booth provided with vertical ventilation and with a system for recuperating excess coating product.

The command and control device for such an installation comprises a command and control system common to the entire installation and command and control systems for each of the machines and other elements of the installation.

The command and control system common to all of the sprayers makes it possible in particular to identify the type of bodywork entering the zone of the installation and to track this bodywork until it leaves the zone. It may be pointed out that several bodyworks may lie in the same zone and may be painted at the same time. This system also keeps the installation safe through the various sensors with which it is equipped, and coordinates the operation of the sprayers and the interfaces with the booth, the conveyor, etc.

The command and control systems for each of the machines allow in particular control over the kinematics of the corresponding machine and control over the spraying parameters of the sprayer(s) it supports. The kinematics and the spraying parameters are specific to each bodywork being treated.

A programmable industrial controller may, for example, be associated with each machine or other element of the installation. Each of these controllers is controlled by another programmable industrial controller commanding and controlling the entire operation. This "master" controller is itself connected to a supervisor which may be in the form of a computer of the personal computer type. If several installations are present in one and the same factory, these command and control systems may be organized into a network and a common computer connected to this network is then used for programming the various parameters for each of the installations.

The "master" programmable controller allows information to be received from the various sensors and, through an appropriate means, determines what type of bodywork is arriving in the zone of the installation with which it is associated. This controller has, in memory, for each of the types of bodywork, a table known as the "spraying table" which contains all the orders of positioning of each of the machines and other elements and the setting of each of the sprayers with respect to the advancement of the bodywork along the conveyor. At regular intervals, each interval corresponding, for example, to the movement of the bodywork along the conveyor by a predetermined distance, the machines and sprayers require new settings because the bodywork has made progress through the installation. After each interval of time, the corresponding orders are thus sent to each of the programmable industrial controllers corresponding to a machine or to another element. These controllers are also known as "slave" controllers as opposed to the "master" controller.

The spraying tables for each of the bodywork types are programmed on the computer mentioned earlier used for programming. For a bodywork of given shape, these tables consist in entering, for various positions of the bodywork in the installation, the various orders corresponding, for example, to the positions of the various axes of each machine, to the flow rate of treatment product for each of these sprayers, to the electrical voltage applied, etc. Once the spraying tables have been programmed they are loaded into the "master" controller using disks or the like.

The supervisor for its part allows the progress of the process to be monitored through its various stages and also allows particular orders to be sent to a machine, particularly in the adjustment or maintenance phase. This supervisor has a screen to allow the process to be displayed and a keyboard for inputting orders and/or modifications.

The time needed to optimize these spraying tables for each of the bodyworks is very high. What is actually required is for a great many points to be entered so that the kinematic envelope of each of the machines is close to the shape of the bodywork. This is true for each of the bodyworks and there are generally on average 20 bodyworks at each production factory. As a result, the number of points in the spraying tables is limited to about 100 depending on the complexity of the exterior shape of the bodywork. In addition, bearing in mind the various types of paint, adjustments to the settings of the sprayers are needed. As a result, the number of tables is further multiplied for each of the shades and tables are obtained which, in total, contain of the order of about 10000 programmed points.

In addition, it is necessary to test these tables in real life, that is to say on a bodywork. This test and setting phase may last from a few days to several weeks. It is costly in terms of time and also in terms of operating costs in that it uses up coating and cleaning product and in that it soils the installation and therefore requires maintenance. Furthermore, in car plants, old installations are often replaced with new ones during the summer shutdown period. There are then four weeks in which the old installation has to be taken down, the infrastructures have to be modified, the new installation has to be assembled, commissioned and tested empty and then finally the application has to be set up so that it will be ready to start in full production with the minimum of rejects. The testing and setting phase represents the lengthiest and the most uncertain part of the commissioning of a new installation.

This phase can be shortened in that there now exist means for allowing spraying tables to be simulated prior to the on-site test phase.

SUMMARY OF THE INVENTION

The present invention provides a common and control device that allows a further reduction in the cost of the test phases by reducing the time needed for these phases and/or the operating costs associated with them. This system will advantageously also allow modifications to be made more easily when a new type of bodywork, or work piece that is to be treated, appears or when the characteristics of the sprayed product change.

According to one aspect of the invention, a command and control system for a surface treatment installation comprises at least one multi-axis machine, each axis being equipped with a driving means, fitted with equipment such as, for example, a sprayer and with corresponding sensors and actuators; a means for allowing the installation to be supervised and comprising at least one first programmable computer provided with a display means and with a means for allowing data to be entered; at least one second programmable computer for managing the axis of the machines and their equipment; a server, which may be common to several installations, allowing spraying tables to be programmed; a first computer network for connecting the server to the second programmable computer(s) for managing the machines and to the means for supervising the installation; and a second computer network for connecting the second programmable computer(s) for managing the machines to the sensors and actuators of the machines.

The first computer network allows in particular the downloading of spraying tables. These can then be programmed online, thus making it possible to reduce the installation downtime. The second network for its part allows settings and measurements needed for various control loops regulating parameters of the installation to be carried out.

The invention applies to installations intended for spraying coating product onto a bodywork but may also be applied to installations for removing dust or to other installations provided with multi-axis machines.

Advantageously, the second programmable computer(s) for managing the axes of machines incorporates (incorporate) a numerical control managing of the axes with interpolation, for example circular interpolation. In this way, the synchronization of the various parameters of the equipment and the kinematic slaving is facilitated. In this case, it may be advantageous to provide, for the driving means associated with the axes of the machines preferably comprising speed variators, a specific third computer network for connecting these variators to the second programmable for computer(s) managing the axes of the machines. This third network allows the position of the machines and of their equipment to be read and the motors operated accordingly.

The command and control system according to the invention preferably also includes a means for identifying the work piece that is to be treated, providing the interface with the booth and the conveyor and also managing safety precautions. The identification, interface and safety means may be in the form of a set of sensors and actuators common to all the machines and connected to the means for supervising the installation.

The command and control system advantageously has a fourth computer network for connecting the means for supervising the installation to the factory computer network. This network allows the type of work piece that is to be treated to be transmitted. The common sensors and actuators are, for example, on the same network as the sensors and actuators specific to each of the machines.

To save time when commissioning on site, the server advantageously has simulation a means for allowing the application of a spraying to a work piece that is to be treated to be displayed.

In order to allow remote intervention to diagnose breakdowns and possibly solve them, the server is, for example, equipped with a first modem allowing it to communicate with a computer situated remotely and also equipped with a second modem. This modem makes it possible, from the remotely-situated computer, to diagnose or operate each of the sensors and actuators of the installation.

BRIEF DESCRIPTION OF THE DRAWINGS

In any event, the invention will be clearly understood with the aid of the description which follows, with reference to the appended schematic drawing which, by way of examples, depicts several forms of embodiment of such a command and control system.

FIG. 1 is a schematic view of a command and control system according to the invention, FIG. 4 is a schematic view of a further alternative form of a command and control system according to further embodiment of the invention.

DETAILED DESCRIPTION OF THE INVENTION

Figure 3:
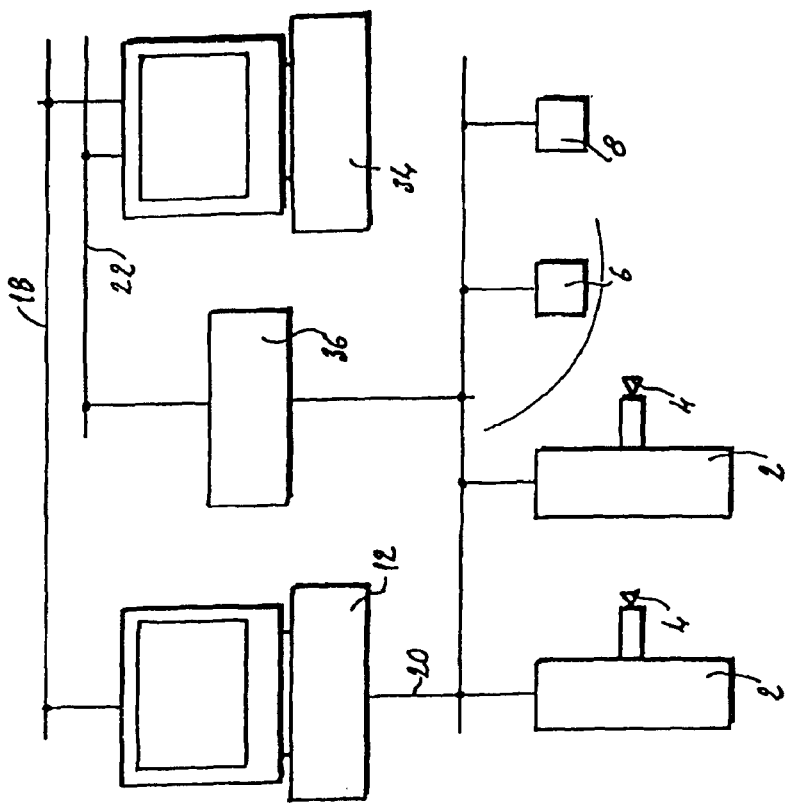
FIG. 3 is a schematic view of another alternative form of a command and control system according to another embodiment of the invention.

FIG. 1 shows one embodiment of a command and control system for a set of surface treatment installations. Each installation is not depicted in detail in the drawing. The various installations are depicted schematically by boxes in chain line. In this description, it may be considered that this is, for example, an installation intended for coating motor vehicle bodyworks, these being carried and moved by a conveyor. The installation is made up for example of two sets of three machines located one on each side of the conveyor. These six machines are intended to paint the roughly vertical lateral faces of the bodywork advancing with the conveyor. These machines are also known as lateral machines. Each of these machines carries an automatic sprayer of coating product. It is a machine with several degrees of freedom that may be qualified as a multi-axis machine. To each degree of freedom, or axis, there corresponds a motor which acts on the machine and directly or indirectly causes the sprayer to move and/or modifies its orientation in space. To treat the surfaces of the car bodywork which are roughly horizontal, use is made, for example, of a machine known as the overhead machine, which carries three sprayers. The overhead machine also has several degrees of freedom and the sprayers it carries can move one with respect to the other. All these machines comprise sensors and actuators for achieving the various movements of the machine and determining its exact position.

To limit paint splashes, a booth is associated with the installation. The bodywork for painting lies in the booth which is relatively well sealed during the spraying operations. In and around the booth there are a certain number of common actuators and sensors for moving the various parts and elements and for determining their position.

The purpose of the command and control system is to manage all the elements that make up the installation in such a way as to obtain fault-free painted motor vehicle bodyworks. To do that, all the spraying parameters of the sprayers need to be managed and the movement of the bodywork on the conveyor needs to be coordinated with respect to the movement of the sprayers. Furthermore, the control system must also ensure that the installation is safe.

Each of the figures schematically depicts two machines 2, on each of which one sprayer 4 is mounted. Each of these machines has a set of specific sensors and actuators which are not individually depicted. Each machine 2 thus symbolizes all the sensors and actuators specific to it.

FIG. 1 also shows four computers 10, 12, 14, and 16 each comprising a central processor and a screen, to each of which a keyboard can be connected for entering data. These computers are, for example, personal computers commonly known as "PCs".

In FIG. 1, a first computer 10 will be known hereinafter as server. A second computer 12 will be known hereinafter as operating computer. The computer bearing the reference 14 will, for its part, be known as the supervisor, while the fourth computer 16 will be known hereinafter as the central computer.

The server 10 is a computer which may be common to several installations of the type of those described hereinabove. It is able to manage a certain number of identical installations or alternatively several installations which all differ from one another. The server 10 allows the spraying tables, in which the kinematics and the operating parameters of the sprayers are predefined, to be programmed.

The operating computer 12 manages the axes of the machines 2 and the sprayers 4. It first of all performs the functions of a programmable industrial controller in that it provides the various axes of the machines 2 and the sprayers 4 with instructions corresponding to positions to be reached and to parameters (paint flow rate, electrical voltage, etc.) to be set. In addition, to optimize the movement of the sprayers 4, the operating computer 12 incorporates the functions of numerical control so as, on the basis of the instructions received, to carry out circular interpolation so as to obtain a movement of the sprayers 4 which best follows the shape of the bodywork that is to be painted.

The supervisor 14 supervises the installation and forms a man/machine interface with the installation. It is therefore possible for a technician, using this computer, to monitor the parameters set in the installation and the position of the various moving parts. A keyboard allows data to be entered to allow a dialogue between the user technician and the installation. The supervisor 14 also incorporates the functions of a controller identifying the bodywork to be painted, providing the interfaces with the booth and the conveyor and managing the various safety precautions implemented in the installation.

A first computer network 18 connects the server 10 to the operating computers 12 and the supervisors 14. This computer network 18 is common to all the installations served by the server 10. In particular it allows the spraying tables to be downloaded. It is then no longer necessary as was generally the case in installations of the prior art to record the spraying tables on a computer medium (disk, CD-ROM, etc.) in order to be able to install them in the operating computer. It is also possible, unlike the case with installations of the prior art, to program the spraying tables online. In addition, the server 10 has simulation means allowing the application of a spraying table to a bodywork that is to be treated to be displayed. This allows an appreciable time saving when commissioning the installation onsite.

A second computer network 20, at an installation, connects the operating computer 12 to the machines 2. It allows the settings and measurements needed for the various control loops regulating the parameters envisaged in the system programming to be performed. Also on this network are the sensors 6 and actuators 8 common to the installation.

Figure 2:
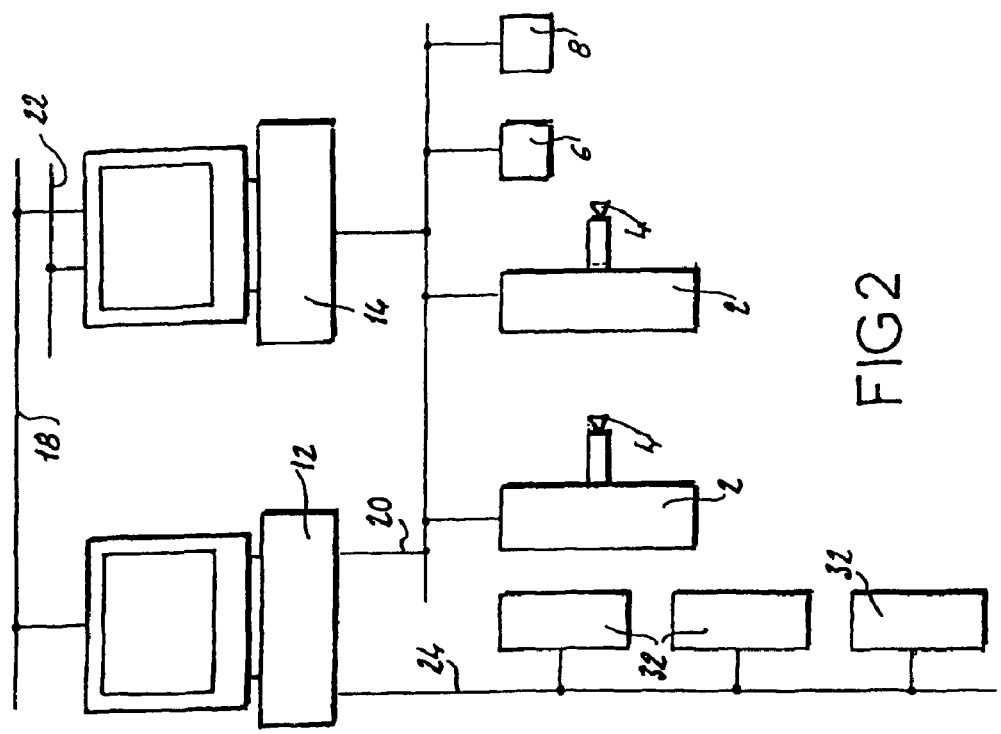
FIG. 2 is a schematic view of an alternative form of a command and control system according to another embodiment of the invention.

FIG. 2 shows an alternative form of embodiment comprising a third network 24, produced, for example, using optical fibers. In this figure, only the devices specific to one installation have been depicted. Each machine 2 of this installation comprises several speed variators 32 for controlling its various motors. Three of these variators 32 have been depicted in FIG. 2. The third network 24 connects the operating computer 12 to the machines 2 and more particularly to the variators 32 controlling the motors thereof. These motors are "digital" electric motors which, at each instance, give precise data regarding their speed and their position. The third computer network 24 allows this information to be imparted to the operating computer 12 and the latter sends instructions to the variators 32 controlling the motors of the machines 2 on the basis of the information received.

A fourth computer network 22, present in all the alternative forms depicted in the drawing, connects the supervisor 14 to the user computer network. As the installation is incorporated into a plant comprising a great many other installations which have all to be managed together for correct plant operation, a link is established with the plant management system. This link is connected to the installation at the level of the supervisor 14. The fourth network transmits to the latter particularly the type of bodywork to be painted.

Furthermore, the server 10 is equipped with a modem 28 which allows the server 10 to be placed in communication with the central computer 16. The latter is also equipped with a modem 30. The central computer is, for example, placed in the premises of the company whose task it is to monitor and maintain the installation. By virtue of the link by modems 28 and 30 it is possible to diagnose a fault remotely because the server has access to all the sensors via the operating computer 12. This modem link allows a significant saving in time and cost because it can allow a problem to be solved without a troubleshooter having to be sent out. This modem link also allows the spraying tables to be written on the central computer, tested on a simulator and then, once the spraying tables have been optimized, they can be downloaded to the server 10.

Like FIG. 2, FIG. 3 shows a third alternative form of embodiment in which the supervisor is in fact made up of a computer 34 and of a programmable industrial controller 36 which is separate. The programmable industrial controller 36 then takes responsibility for the command and control of the sensors 6 and actuators 8 common to the installation, and the computer 34 takes responsibility for displaying and inputting commands. The computer 34 and the programmable industrial controller 36 are both connected to the fourth computer network 22, connected to the user computer network.

FIG. 4 shows an alternative form of embodiment in which the functions of the operating computer 12 and of the supervisor 14 in FIGS. 1 and 2 are grouped together into one and the same computer.

The command and control systems described hereinabove make it possible to achieve significant time savings when commissioning a painting installation and when fault finding. They also allow greater flexibility because they make modifications within the manufacturer's range easier. It becomes easier to add a new shade of paint or a new type of bodywork to the spraying tables.

The invention also encompasses other alternative forms of embodiment within the scope of the attached claims.

Thus, for example, the command and control system according to the invention applies not only to an installation comprising paint sprayers but also may apply to the field of powder coating and to an installation comprising machines for removing dust.

The modem connection between a central computer and the command and control system is optional and it would not be departing from the scope of the invention if this connection were not provided.

In place of the operating computer described and depicted in FIG. 1, it is possible to provide several operating computers. These are not necessarily a computer of the "PC" type but may for example also be programmable computers of the controller type.

The description hereinabove anticipates an operating computer incorporating the functions of numerical control and carrying out circular interpolation of the instructions received in order to control the sprayers. The system according to the invention does not necessarily include these numerical control functions and where it does include them, the sprayers are not necessarily controlled through circular interpolation.

What is claimed is:

1. A command and control system for a surface treatment installation comprising:
    a multi-axis machine, each axis being equipped with a driving means, the machine fitted with a sprayer and with a corresponding sensor and an actuator;
    a means for supervising the surface treatment installation comprising a first programmable computer including a display means and a means for allowing data to be input;
    a second programmable computer for managing the axes of the machine and the sprayer;
    a server for allowing a spraying table to be programmed;
    a first computer network for connecting the server to the second programmable computer for managing the machine and for connecting the server to the means for supervising the installation; and
    a second computer network for connecting the second programmable computer for managing the machine and connected to the sensor and the actuator of the machine.

2. The command and control system as claimed in claim 1, wherein the second programmable computer for managing the axes of the machine includes a numerical control managing of the axes of the machine with interpolation.

3. The command and control system as claimed in claim 2, wherein the interpolation is circular interpolation.

4. The command and control system as claimed in claim 2, wherein the driving means associated with the axes of the machine comprises a speed variator.

5. The command and control system as claimed in 4, wherein the command and control system further comprises a third computer network for connecting the variator to the second programmable computer for managing the axes of the machine.

6. The command and control system as claimed in claim 1, further comprising a means for identifying a work piece that is to be treated, providing interface with a booth and a conveyor, and managing safety precautions.

7. The command and control system as claimed in claim 6, wherein the means for identifying the work piece that is to be treated, providing interface with the booth and the conveyor, and managing safety precautions comprise a set of sensors and actuators and is connected to the means for supervising the installation.

8. The command and control system as claimed in claim 7, wherein the means for supervising the installation comprises an installation computer and a programmable controller.

9. The command and control system as claimed in claim 8, wherein the set of command sensors and actuators is connected to the programmable controller.

10. The command and control system as claimed in claim 1, wherein the means for supervising the installation and the second programmable computer for managing the machine are incorporated into the same computer.

11. The command and control system as claimed in claim 1, further comprising a third computer network for connecting the means for supervising the installation to a fourth computer network of a factory.

12. The command and control system as claimed in claim 1, wherein the server includes a simulation means for allowing an application of the spraying table to a work piece that is to be treated to be displayed.

13. The command and control system as claimed in claim 1, wherein the server includes a first modem for allowing the server to communicate with a third computer situated remotely and equipped with a second modem.

* * * * *